(12) United States Patent
Jain et al.

(10) Patent No.: US 12,579,293 B2
(45) Date of Patent: Mar. 17, 2026

(54) SYSTEMS AND METHODS FOR API GATEWAY SYNCHRONIZATION WITH CLOUD STORAGE

(71) Applicants: RAKUTEN MOBILE USA LLC, San Mateo, CA (US); Rakuten Symphony, Inc., Tokyo (JP)

(72) Inventors: Gaurav Jain, San Mateo, CA (US); Mohit Goyal, Indore (IN); Hemant Sharma, Indore (IN); Shudhanshu Shekhar, Indore (IN)

(73) Assignees: RAKUTEN MOBILE USA LLC, San Mateo, CA (US); RAKUTEN SYMPHONY, INC., Tokyo (JP)

( * ) Notice: Subject to any disclaimer, the term of this patent is extended or adjusted under 35 U.S.C. 154(b) by 128 days.

(21) Appl. No.: 18/517,657

(22) Filed: Nov. 22, 2023

(65) Prior Publication Data

US 2025/0165635 A1 May 22, 2025

(51) Int. Cl.
*G06F 21/62* (2013.01)

(52) U.S. Cl.
CPC ................................. *G06F 21/6218* (2013.01)

(58) Field of Classification Search
None
See application file for complete search history.

(56) References Cited

U.S. PATENT DOCUMENTS

2022/0391494 A1* 12/2022 Yang ................... G06F 21/6209

* cited by examiner

*Primary Examiner* — Brandon Hoffman
(74) *Attorney, Agent, or Firm* — Sughrue Mion, PLLC

(57) ABSTRACT

Provided are a method, system, and device for onboarding an API using an API gateway, the method may include: receiving, by a traffic manager (TM) module, an event message originating from an all-in-one (AIO) module of a first datacenter; receiving, by the TM module, execution plan data from a cloud storage object, wherein the execution plan data may be used to configure load throttling of an API; forwarding, by the TM module, the event message to a key manager (KM) module; receiving, by the TM module, a security file event response from the KM module; forwarding, by the TM module, the event message to an API gateway; receiving, by the TM module, an API data event response from the API gateway; and sending, by the TM module, an API onboarding response event to the AIO module of the first datacenter based on the API data event response.

20 Claims, 5 Drawing Sheets

FIG. 2

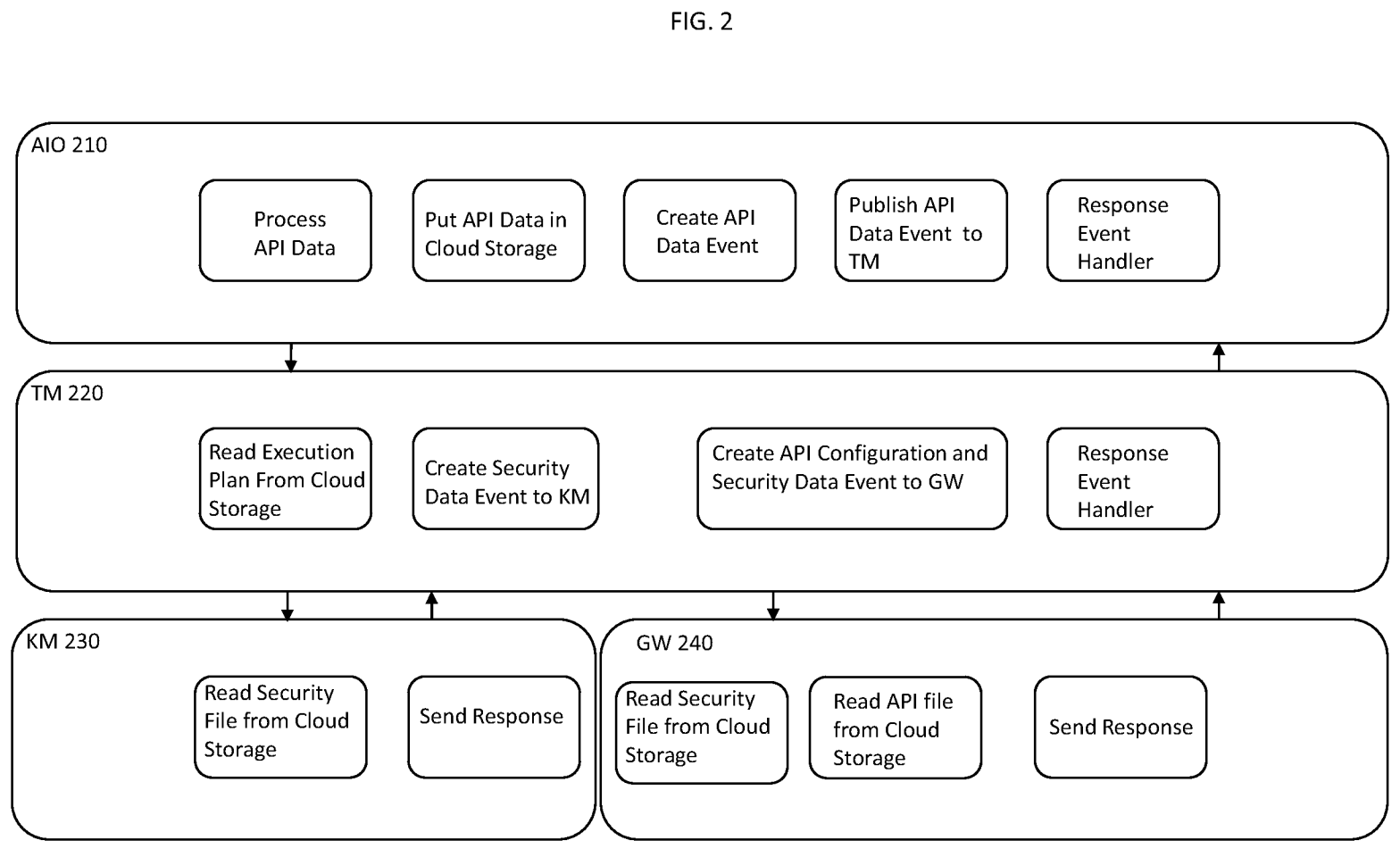

AIO 210

| Process API Data | Put API Data in Cloud Storage | Create API Data Event | Publish API Data Event to TM | Response Event Handler |

TM 220

| Read Execution Plan From Cloud Storage | Create Security Data Event to KM | Create API Configuration and Security Data Event to GW | Response Event Handler |

KM 230

| Read Security File from Cloud Storage | Send Response |

GW 240

| Read Security File from Cloud Storage | Read API file from Cloud Storage | Send Response |

SYSTEMS AND METHODS FOR API GATEWAY SYNCHRONIZATION WITH CLOUD STORAGE

1. FIELD

Systems and methods consistent with example embodiments of the present disclosure relate to providing a method for configuring an API gateway to synchronize with cloud storage.

2. DESCRIPTION OF RELATED ART

In the related art, an API Gateway may be used as an access point to allow an application (e.g., a client-side browser native app or a server based web app) to access backend services by providing access to an API. The API Gateway may be responsible for providing communication, authentication, authorization and throttling between multiple microservices and also providing all configuration data required for use during runtime.

SUMMARY

According to the related art, different data storage methods for data availability functionality of the API Gateway may be used. For example, a Network File System (NFS) storage may be used for data availability across multiple API Gateway instances. However, NFS storage may have significant challenges in achieving real time synchronization (sync) between data centers spread across various regions. There may also be no automatic failover mechanism.

On the other hand, while cloud storage may be available in the related art and may achieve real time sync, the functionality available in related art methods may be too basic, and may not be an entirely optimal method for achieving real time sync across multiple API Gateway instances. Furthermore, related art methods may not implement event based communication for asynchronous operation.

Accordingly, there is a need for a method to provide API gateway synchronization with cloud storage using event based communication.

According to embodiments, a method for onboarding an API using an API gateway may be provided. The method may include: receiving, by a traffic manager (TM) module, an event message originating from an all-in-one (AIO) module of a first datacenter; receiving, by the TM module, execution plan data from a cloud storage object, wherein the execution plan data may be used to configure load throttling of an API; forwarding, by the TM module, the event message to a key manager (KM) module; receiving, by the TM module, a security file event response from the KM module; forwarding, by the TM module, the event message to an API gateway; receiving, by the TM module, an API data event response from the API gateway; and sending, by the TM module, an API onboarding response event to the AIO module of the first datacenter based on the API data event response. Accordingly, it can be understood that since the solution provides an event-based communication sequence and real-time sync between a data center module and the cloud storage, a cost effective Active-Active solution which is also cloud native can be achieved.

According to embodiments, an apparatus for onboarding an API using an API gateway may be provided, wherein the apparatus is configured to: receive, by a traffic manager (TM) module, an event message originating from an all-inone (AIO) module of a first datacenter; receive, by the TM module, execution plan data from a cloud storage object, wherein the execution plan data may be used to configure load throttling of an API; forward, by the TM module, the event message to a key manager (KM) module; receive, by the TM module, a security file event response from the KM module; forward, by the TM module, the event message to an API gateway; receive, by the TM module, an API data event response from the API gateway; and send, by the TM module, an API onboarding response event to the AIO module of the first datacenter based on the API data event response.

According to embodiments, a non-transitory computer-readable recording medium may be provided having recorded thereon instructions to perform a method comprising: receiving, by a traffic manager (TM) module, an event message originating from an all-in-one (AIO) module of a first datacenter; receiving, by the TM module, execution plan data from a cloud storage object, wherein the execution plan data may be used to configure load throttling of an API; forwarding, by the TM module, the event message to a key manager (KM) module; receiving, by the TM module, a security file event response from the KM module; forwarding, by the TM module, the event message to an API gateway; receiving, by the TM module, an API data event response from the API gateway; and sending, by the TM module, an API onboarding response event to the AIO module of the first datacenter based on the API data event response.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIG. 2 illustrates a block diagram indicating functionality of system modules according to an embodiment;

DETAILED DESCRIPTION

Figure 1:
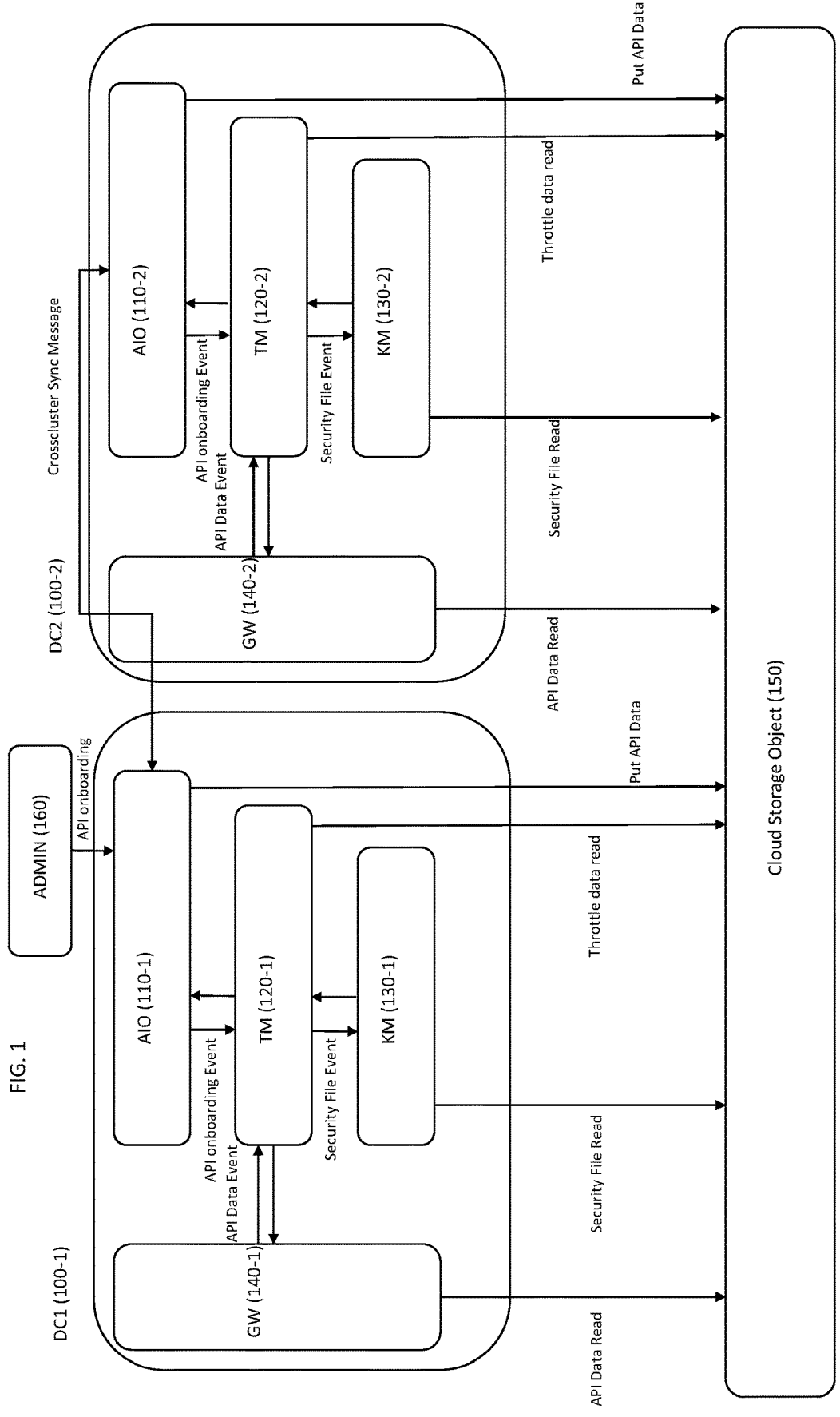
FIG. 1 illustrates a system architecture block diagram including two data centers configured to synchronize with cloud storage, according to an embodiment.

The following detailed description of example embodiments refers to the accompanying drawings.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Example embodiments of the present invention provide a method for onboarding an API using an API gateway. The method may include receiving, by a traffic manager (TM) module, an event message originating from an all-in-one (AIO) module of a first datacenter; receiving, by the TM module, execution plan data from a cloud storage object, wherein the execution plan data may be used to configure load throttling of an API; forwarding, by the TM module, the event message to a key manager (KM) module; receiving, by the TM module, a security file event response from the KM module; forwarding, by the TM module, the event message to an API gateway; receiving, by the TM module, an API data event response from the API gateway; and sending, by the TM module, an API onboarding response event to the AIO module of the first datacenter based on the API data event response. Accordingly, based on the above, it can be understood that since the solution provides an event-based communication sequence and real-time sync between a data center module and the cloud storage, a cost effective Active-Active solution which is also cloud native can be achieved.

FIG. 1 illustrates a system architecture block diagram including two data centers configured to synchronize with cloud storage, according to an embodiment. In particular, data center 100-1 (DC1) and data center 100-2 (DC2) may be provided. DC1 and DC2 may be considered to be substantially similar in terms of configuration.

All in One (AIO) module 110-1 and 110-2 may provide a user interface for API onboarding. According to an embodiment, the user may interact with the AIO for API configuration and onboarding and to store metadata in the database and file data directly in cloud storage objects (e.g., cloud storage object 150), as well as publish an API onboarding event in the form of an event message (including a file name and file id) to the Traffic Manager 120-1, 120-2. The AIO may be provided in the form of a user interface, (e.g., a GUI or a command line interface, etc.). The AIO may put API data directly into cloud storage object 150. The AIO may also be configured to send a message to cross cluster sync to a neighboring data center unit (in this illustrated embodiment in FIG. 1, a cross cluster sync message may be sent between AIO 110-1 and 110-2 in order to synchronize the API from DC1 with DC2)

Traffic manager (TM) module 120-1, 120-2 may provide load throttling, and download the throttling data of the API from the cloud storage object 150, store it in local storage, and configure it on local storage (e.g., throttle data read). Events (API data event to and from GW 140-1, 140-2, security file event to and from KM 130-1, 130-2) may be sent by the TM for sending/receiving API configurations.

According to an embodiment, Key Manager (KM) 130-1, 130-2 may provide API authentication and authorization. For example, the KM may be in communication with the cloud storage object 150 to provide authentication by reading a security file. As mentioned above, KM 130-1, 130-2 may send and receive security file events from TM 120-1, 120-2.

According to an embodiment, Gateway (GW) 140-1, 140-2 may be provided. The GW may receive an event from TM 120-1, 120-2 (e.g. API Data Event) for API configuration. The GW may also receive API file name, file identifier, and other security details. The GW may be configured to send a request to the cloud storage object 150 for downloading or removing an API configuration. It should be appreciated that the GW may be configured to store the API configuration file having a file id on local instance storage, and a gateway engine loading module may be configured to unload the API configuration file having the file ID, and apply the configuration with API metadata on a new API. Thereafter, the client will be able to consume the API from multiple data centers.

Cloud storage object 150 may be implemented with any appropriate cloud storage network. Cloud storage object 150 may primarily be used to store API data and API configuration data, but it should be appreciated that other data may be stored in cloud storage object depending on the implementation, as will be appreciated by one skilled in the art.

Admin 160 may be an administrative module which can provide an API onboarding instruction to AIO 110-1 for DC1, as illustrated in FIG. 1. DC2 may be able to receive the API configuration from DC1 via the cross cluster sync message.

FIG. 2 illustrates a block diagram indicating functionality of system modules according to an embodiment. It should be appreciated that AIO 210 may be similar to AIO 110-1, 110-2, TM 220 may be similar to TM 120-1, 120-2, KM 230 may be similar to KM 130-1, 130-2, and GW 240 may be similar to GW 140-1, 140-2 discussed above. Accordingly, redundant descriptions may be omitted to improve readability.

As illustrated in FIG. 2, AIO 210 is in communication with TM 220 (both sending and receiving). Although not explicitly illustrated, it should be noted that AIO 210 may also be in communication with cloud storage (e.g., cloud storage object 150). AIO 210 may be able to process API data, put API data into cloud storage, create an API data event, and publish the API data event to TM 220. A response event handler is also included in order to allow AIO 210 to interpret response events received from TM 220.

As illustrated in FIG. 2, TM 220 is in communication with AIO 210, KM 230, and GW 240 (both sending and receiving). Although not explicitly illustrated, it should be noted that TM 220 may also be in communication with cloud storage (e.g., cloud storage object 150). TM 220 may be able to request and receive execution plans from cloud storage, wherein the execution plan data may be used to configure load throttling of an API. A response event handler is also included in order to allow TM 220 to interpret response events received from KM 230 and GW 240.

As illustrated in FIG. 2, KM 230 is in communication with TM 220 (both sending and receiving). Although not explicitly illustrated, it should be noted that KM 230 may also be in communication with cloud storage (e.g., cloud storage object 150). KM 230 may be able to read security files from cloud storage upon receiving a security data event, and send a response event back to TM 220.

As illustrated in FIG. 2, GW 240 is in communication with TM 220 (both sending and receiving). Although not explicitly illustrated, it should be noted that GW 240 may also be in communication with cloud storage (e.g., cloud storage object 150). GW 240 may be able to request and read security files as well as API files from cloud storage based on events received from TM 220, and send a response event back to TM 220.

Figure 3:
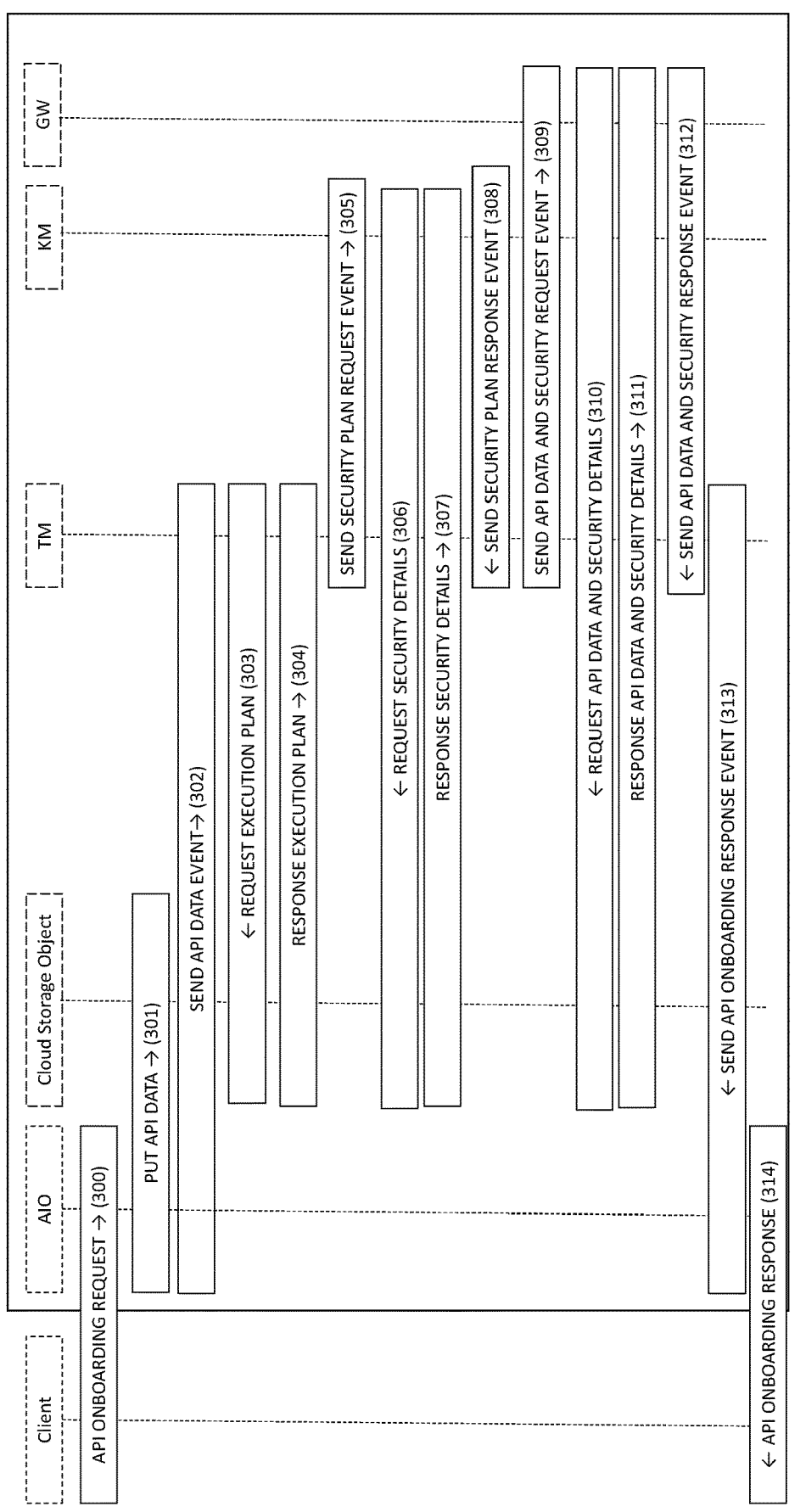
FIG. 3 illustrates a call flow diagram for handling an API onboarding request, according to an embodiment.

FIG. 3 illustrates a call flow diagram for handling an API onboarding request, according to an embodiment. It should be appreciated that the AIO, Cloud storage object, TM, KM, and GW specified with reference to FIG. 3 may be similar to their respective counterparts described in either one of FIG. 1 or FIG. 2 discussed above.

At operation 300, an API onboarding request may be sent from the client to AIO. It should be appreciated that the client may be any appropriate user terminal.

At operation 301, based on the API onboarding request, the AIO may PUT API data into the cloud storage object. According to some embodiments, the AIO may also put security files and execution files into the cloud storage object in the PUT step during operation 301.

At operation 302, AIO may send an API data event to the TM. The event may be in the form of an event message.

At operations 303 and 304, upon receiving the API data event from operation 302, TM may request and receive an execution plan (for configuring load throttling of an API) from the cloud storage object.

At operation 305, TM may send a security plan request event to KM. In response, KM may request and receive security details from cloud storage in operations 306 and 307. Accordingly, KM may send a security plan response event to TM in operation 308.

At operation 309, TM may send a API and security request event to GW. In response, GW may request and receive API data and security details from cloud storage in operations 310 and 311. Accordingly, GW may send a API data and security response event to TM in operation 312.

At operation 313, TM may send an API onboarding response event back to AIO. In response, AIO may send the API onboarding response to the client.

The above embodiments can accordingly provide an event-based communication sequence and real-time sync between a data center module and the cloud storage, a cost effective Active-Active solution which is also cloud native can be achieved.

Figure 4:
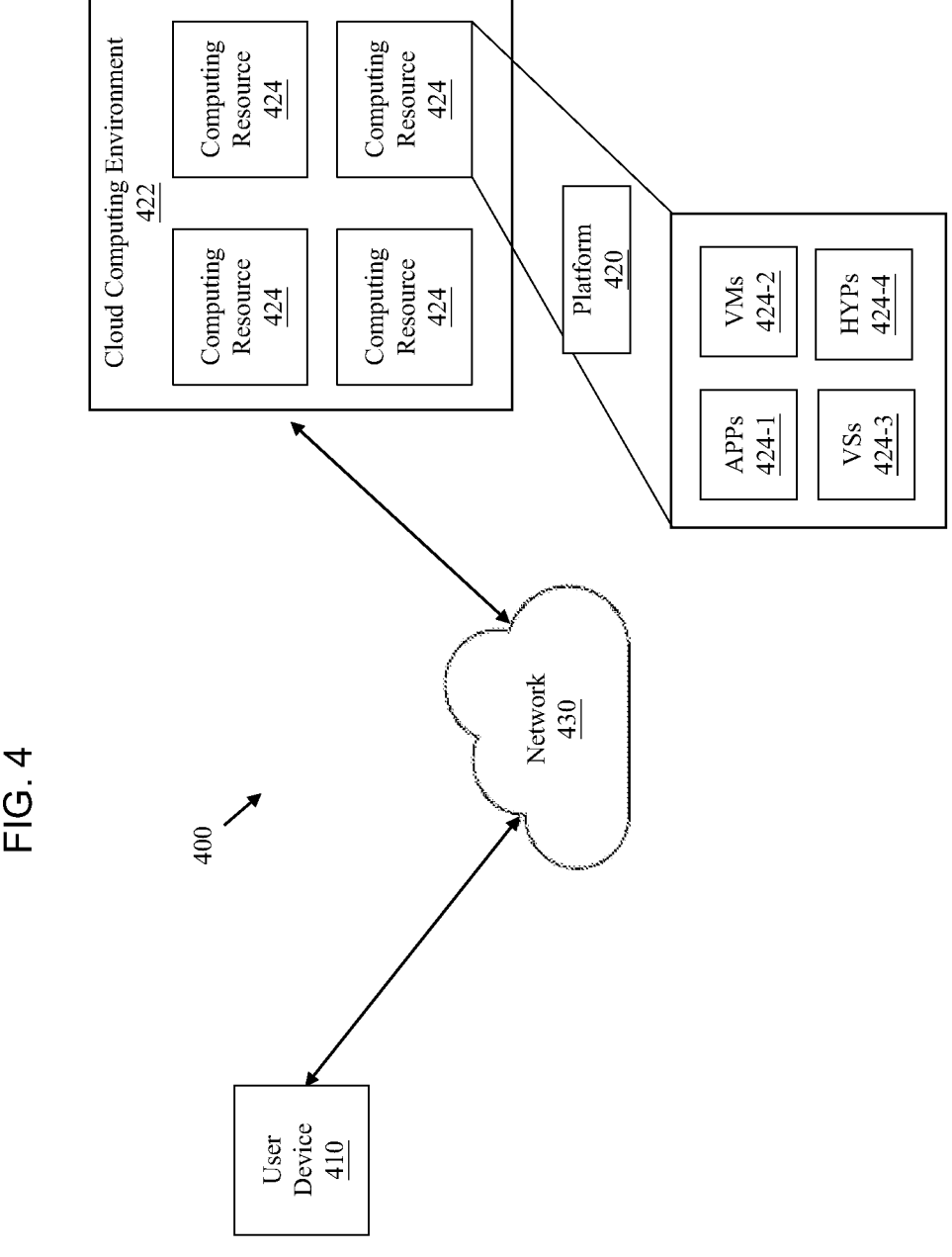
FIG. 4 is a diagram of an example environment in which systems and/or methods, described herein, may be implemented.

FIG. 4 is a diagram of an example environment 400 in which systems and/or methods, described herein, may be implemented. As shown in FIG. 4, environment 400 may include a user device 410, a platform 420, and a network 430. Devices of environment 400 may interconnect via wired connections, wireless connections, or a combination of wired and wireless connections. In embodiments, any of the functions and operations described with reference to FIGS. 1 through 3 above may be performed by any combination of elements illustrated in FIG. 4.

User device 410 includes one or more devices capable of receiving, generating, storing, processing, and/or providing information associated with platform 420. For example, user device 410 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 410 may receive information from and/or transmit information to platform 420.

Platform 420 includes one or more devices capable of receiving, generating, storing, processing, and/or providing information. In some implementations, platform 420 may include a cloud server or a group of cloud servers. In some implementations, platform 420 may be designed to be modular such that certain software components may be swapped in or out depending on a particular need. As such, platform 420 may be easily and/or quickly reconfigured for different uses.

In some implementations, as shown, platform 420 may be hosted in cloud computing environment 422. Notably, while implementations described herein describe platform 420 as being hosted in cloud computing environment 422, in some implementations, platform 420 may not be cloud-based (i.e., may be implemented outside of a cloud computing environment) or may be partially cloud-based.

Cloud computing environment 422 includes an environment that hosts platform 420. Cloud computing environment 422 may provide computation, software, data access, storage, etc., services that do not require end-user (e.g., user device 410) knowledge of a physical location and configuration of system(s) and/or device(s) that hosts platform 420. As shown, cloud computing environment 422 may include a group of computing resources 424 (referred to collectively as "computing resources 424" and individually as "computing resource 424").

Computing resource 424 includes one or more personal computers, a cluster of computing devices, workstation computers, server devices, or other types of computation and/or communication devices. In some implementations, computing resource 424 may host platform 420. The cloud resources may include compute instances executing in computing resource 424, storage devices provided in computing resource 424, data transfer devices provided by computing resource 424, etc. In some implementations, computing resource 424 may communicate with other computing resources 424 via wired connections, wireless connections, or a combination of wired and wireless connections.

As further shown in FIG. 4, computing resource 424 includes a group of cloud resources, such as one or more applications ("APPs") 424-1, one or more virtual machines ("VMs") 424-2, virtualized storage ("VSs") 424-3, one or more hypervisors ("HYPs") 424-4, or the like.

Application 424-1 includes one or more software applications that may be provided to or accessed by user device 410. Application 424-1 may eliminate a need to install and execute the software applications on user device 410. For example, application 424-1 may include software associated with platform 420 and/or any other software capable of being provided via cloud computing environment 422. In some implementations, one application 424-1 may send/receive information to/from one or more other applications 424-1, via virtual machine 424-2.

Virtual machine 424-2 includes a software implementation of a machine (e.g., a computer) that executes programs like a physical machine. Virtual machine 424-2 may be either a system virtual machine or a process virtual machine, depending upon use and degree of correspondence to any real machine by virtual machine 424-2. A system virtual machine may provide a complete system platform that supports execution of a complete operating system ("OS"). A process virtual machine may execute a single program, and may support a single process. In some implementations, virtual machine 424-2 may execute on behalf of a user (e.g., user device 410), and may manage infrastructure of cloud computing environment 422, such as data management, synchronization, or long-duration data transfers.

Virtualized storage 424-3 includes one or more storage systems and/or one or more devices that use virtualization techniques within the storage systems or devices of computing resource 424. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 424-4 may provide hardware virtualization techniques that allow multiple operating systems (e.g., "guest operating systems") to execute concurrently on a host computer, such as computing resource 424. Hypervisor 424-4 may present a virtual operating platform to the guest operating systems, and may manage the execution of the guest operating systems. Multiple instances of a variety of operating systems may share virtualized hardware resources.

Network 430 includes one or more wired and/or wireless networks. For example, network 430 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
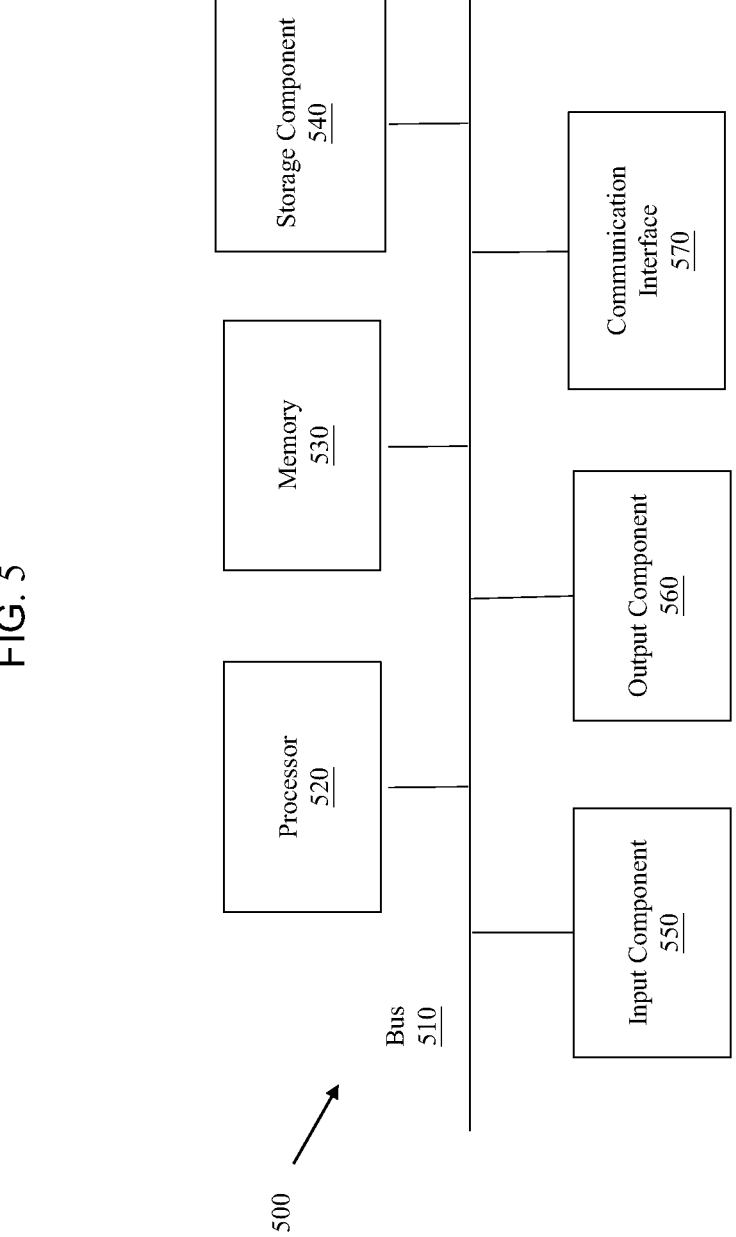
FIG. 5 is a diagram of example components of a device according to an embodiment.

FIG. 5 is a diagram of example components of a device 500. Device 500 may correspond to user device 410 and/or platform 420. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 may be implemented in hardware, firmware, or a combination of hardware and software. Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes in response to processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

In embodiments, any one of the operations or processes of FIGS. 1-3 may be implemented by or using any one of the elements illustrated in FIGS. 4 and 5. It is understood that other embodiments are not limited thereto, and may be implemented in a variety of different architectures (e.g., bare metal architecture, any cloud-based architecture or deployment architecture such as Kubernetes, Docker, OpenStack, etc.).

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function (s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

VARIOUS ASPECTS OF EMBODIMENTS

Various further respective aspects and features of embodiments of the present disclosure may be defined by the following items:

Item [1]: A method for onboarding an API using an API gateway, the method comprising: receiving, by a traffic manager (TM) module, an event message originating from an all-in-one (AIO) module of a first datacenter; receiving, by the TM module, execution plan data from a cloud storage object, wherein the execution plan data may be used to configure load throttling of an API; forwarding, by the TM module, the event message to a key manager (KM) module; receiving, by the TM module, a security file event response from the KM module; forwarding, by the TM module, the event message to an API gateway; receiving, by the TM module, an API data event response from the API gateway; and sending, by the TM module, an API onboarding response event to the AIO module of the first datacenter based on the API data event response.

Item [2]: The method according to item [1], wherein upon receiving the API onboarding response event, the AIO module of the first datacenter is configured to send a cross cluster sync message to an AIO module of a second datacenter.

Item [3]. The method according to any one of items [1]-[2], wherein the KM module, upon receiving the event message, is configured to request and receive security details from the cloud storage object.

Item [4]. The method according to any one of item [1]-[3], wherein the API gateway, upon receiving the event message, is configured to request and receive the API and security details from the cloud storage.

Item [5]: The method according to any one of items [1]-[4], wherein the AIO module of the first datacenter is configured to send the event message to the TM module after receiving an API onboarding request from a client.

Item [6]: The method according to any one of item [1]-[5], wherein the AIO module of the first datacenter is configured to put API data, security files, and execution files in the cloud storage object after receiving an API onboarding request from a client.

Item [7]. The method according to any one of items [1]-[6], wherein the AIO module of the first datacenter is configured to send an API onboarding response to a client after receiving the API onboarding response event.

Item [8]. An apparatus for onboarding an API using an API gateway, wherein the apparatus is configured to: receive, by a traffic manager (TM) module, an event message originating from an all-in-one (AIO) module of a first datacenter; receive, by the TM module, execution plan data from a cloud storage object, wherein the execution plan data may be used to configure load throttling of an API; forward, by the TM module, the event message to a key manager (KM) module; receive, by the TM module, a security file event response from the KM module; forward, by the TM module, the event message to an API gateway; receive, by the TM module, an API data event response from the API gateway; and send, by the TM module, an API onboarding response event to the AIO module of the first datacenter based on the API data event response.

Item [9]. The apparatus according to item [8], wherein upon receiving the API onboarding response event, the AIO module of the first datacenter is configured to send a cross cluster sync message to an AIO module of a second datacenter.

Item [10]. The apparatus according to any one of items [8]-[9], wherein the KM module, upon receiving the event message, is configured to request and receive security details from the cloud storage object.

Item [11]. The apparatus according to any one of items [8]-[10], wherein the API gateway, upon receiving the event message, is configured to request and receive the API and security details from the cloud storage Item [12]. The apparatus according to any one of items [8]-[11], wherein the AIO module of the first datacenter is configured to send the event message to the TM module after receiving an API onboarding request from a client.

Item [13]. The apparatus according to any one of items [8]-[12], wherein the AIO module of the first datacenter is configured to put API data, security files, and execution files in the cloud storage object after receiving an API onboarding request from a client.

Item [14]. The apparatus according to any one of items [8]-[13], wherein the AIO module of the first datacenter is configured to send an API onboarding response to a client after receiving the API onboarding response event.

Item [15] A non-transitory computer-readable recording medium having recorded thereon instructions to perform a method comprising: receiving, by a traffic manager (TM) module, an event message originating from an all-in-one (AIO) module of a first datacenter; receiving, by the TM module, execution plan data from a cloud storage object, wherein the execution plan data may be used to configure load throttling of an API; forwarding, by the TM module, the event message to a key manager (KM) module; receiving, by the TM module, a security file event response from the KM module; forwarding, by the TM module, the event message to an API gateway; receiving, by the TM module, an API data event response from the API gateway; and sending, by the TM module, an API onboarding response event to the AIO module of the first datacenter based on the API data event response.

Item [16]. The non-transitory computer-readable recording medium according to item [15], wherein upon receiving the API onboarding response event, the AIO module of the first datacenter is configured to send a cross cluster sync message to an AIO module of a second datacenter.

Item [17]. The non-transitory computer-readable recording medium according to any one of items [15]-[16], wherein the KM module, upon receiving the event message, is configured to request and receive security details from the cloud storage object.

Item [18]. The non-transitory computer-readable recording medium according to any one of items [15]-[17], wherein the API gateway, upon receiving the event message, is configured to request and receive the API and security details from the cloud storage Item [19]. The non-transitory computer-readable recording medium according to any one of items [15]-[18], wherein the AIO module of the first datacenter is configured to send the event message to the TM module after receiving an API onboarding request from a client.

Item [20]. The non-transitory computer-readable recording medium according to any one of items [15]-[19], wherein the AIO module of the first datacenter is configured to put API data, security files, and execution files in the cloud storage object after receiving an API onboarding request from a client.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. A method for onboarding an application programming interface (API) using an API gateway, the method comprising:

receiving, by a traffic manager (TM) module, an event message originating from an all-in-one (AIO) module of a first datacenter;

based on the event message, receiving, by the TM module, execution plan data from a cloud storage object, wherein the execution plan data is to configure load throttling of the API;

forwarding, by the TM module, the event message to a key manager (KM) module to configure security for accessing the API;

receiving, by the TM module, a security file event response from the KM module based on the forwarding of the event message;

forwarding, by the TM module, the event message to an API gateway to configure the API at the API gateway;

receiving, by the TM module, an API data event response from the API gateway based on the forwarding of the event message; and sending, by the TM module, an API onboarding response event to the AIO module of the first datacenter based on the API data event response.

2. The method as claimed in claim 1, wherein upon receiving the API onboarding response event, the AIO module of the first datacenter is configured to send a cross cluster sync message to an AIO module of a second datacenter.

3. The method as claimed in claim 1, wherein the KM module, upon receiving the event message, is configured to request and receive security details from the cloud storage object.

4. The method as claimed in claim 1, wherein the API gateway, upon receiving the event message, is configured to request and receive the API and security details from the cloud storage.

5. The method as claimed in claim 1, wherein the AIO module of the first datacenter is configured to send the event message to the TM module after receiving an API onboarding request from a client.

6. The method as claimed in claim 1, wherein the AIO module of the first datacenter is configured to put API data, security files, and execution files in the cloud storage object after receiving an API onboarding request from a client.

7. The method as claimed in claim 1, wherein the AIO module of the first datacenter is configured to send an API onboarding response to a client after receiving the API onboarding response event.

8. An apparatus for onboarding an API using an API gateway, wherein the apparatus is configured to:

receive, by a traffic manager (TM) module, an event message originating from an all-in-one (AIO) module of a first datacenter;

based on the event message, receive, by the TM module, execution plan data from a cloud storage object, wherein the execution plan data is to configure load throttling of the API;

forward, by the TM module, the event message to a key manager (KM) module to configure security for accessing the API;

receive, by the TM module, a security file event response from the KM module based on the forwarding of the event message;

forward, by the TM module, the event message to an API gateway to configure the API at the API gateway;

receive, by the TM module, an API data event response from the API gateway based on the forwarding of the event message; and send, by the TM module, an API onboarding response event to the AIO module of the first datacenter based on the API data event response.

9. The apparatus as claimed in claim 8, wherein upon receiving the API onboarding response event, the AIO module of the first datacenter is configured to send a cross cluster sync message to an AIO module of a second datacenter.

10. The apparatus as claimed in claim 8, wherein the KM module, upon receiving the event message, is configured to request and receive security details from the cloud storage object.

11. The apparatus as claimed in claim 8, wherein the API gateway, upon receiving the event message, is configured to request and receive the API and security details from the cloud storage.

12. The apparatus as claimed in claim 8, wherein the AIO module of the first datacenter is configured to send the event message to the TM module after receiving an API onboarding request from a client.

13. The apparatus as claimed in claim 8, wherein the AIO module of the first datacenter is configured to put API data, security files, and execution files in the cloud storage object after receiving an API onboarding request from a client.

14. The apparatus as claimed in claim 8, wherein the AIO module of the first datacenter is configured to send an API onboarding response to a client after receiving the API onboarding response event.

15. A non-transitory computer-readable recording medium having recorded thereon instructions to perform a method comprising:

receiving, by a traffic manager (TM) module, an event message originating from an all-in-one (AIO) module of a first datacenter;

based on the event message, receiving, by the TM module, execution plan data from a cloud storage object, wherein the execution plan data is to configure load throttling of the API;

forwarding, by the TM module, the event message to a key manager (KM) module to configure security for accessing the API;

receiving, by the TM module, a security file event response from the KM module based on the forwarding of the event message;

forwarding, by the TM module, the event message to an API gateway to configure the API at the API gateway;

receiving, by the TM module, an API data event response from the API gateway based on the forwarding of the event message; and sending, by the TM module, an API onboarding response event to the AIO module of the first datacenter based on the API data event response.

16. The non-transitory computer-readable recording medium as claimed in claim 1, wherein upon receiving the API onboarding response event, the AIO module of the first datacenter is configured to send a cross cluster sync message to an AIO module of a second datacenter.

17. The non-transitory computer-readable recording medium as claimed in claim 15, wherein the KM module, upon receiving the event message, is configured to request and receive security details from the cloud storage object.

18. The non-transitory computer-readable recording medium as claimed in claim 15, wherein the API gateway, upon receiving the event message, is configured to request and receive the API and security details from the cloud storage.

19. The non-transitory computer-readable recording medium as claimed in claim 15, wherein the AIO module of the first datacenter is configured to send the event message to the TM module after receiving an API onboarding request from a client.

20. The non-transitory computer-readable recording medium as claimed in claim 15, wherein the AIO module of the first datacenter is configured to put API data, security files, and execution files in the cloud storage object after receiving an API onboarding request from a client.

* * * * *